C. O. HARPER.
CAMERA ATTACHMENT.
APPLICATION FILED AUG. 18, 1908. RENEWED APR. 26, 1912.
1,068,895.
Patented July 29, 1913.
3 SHEETS—SHEET 1.
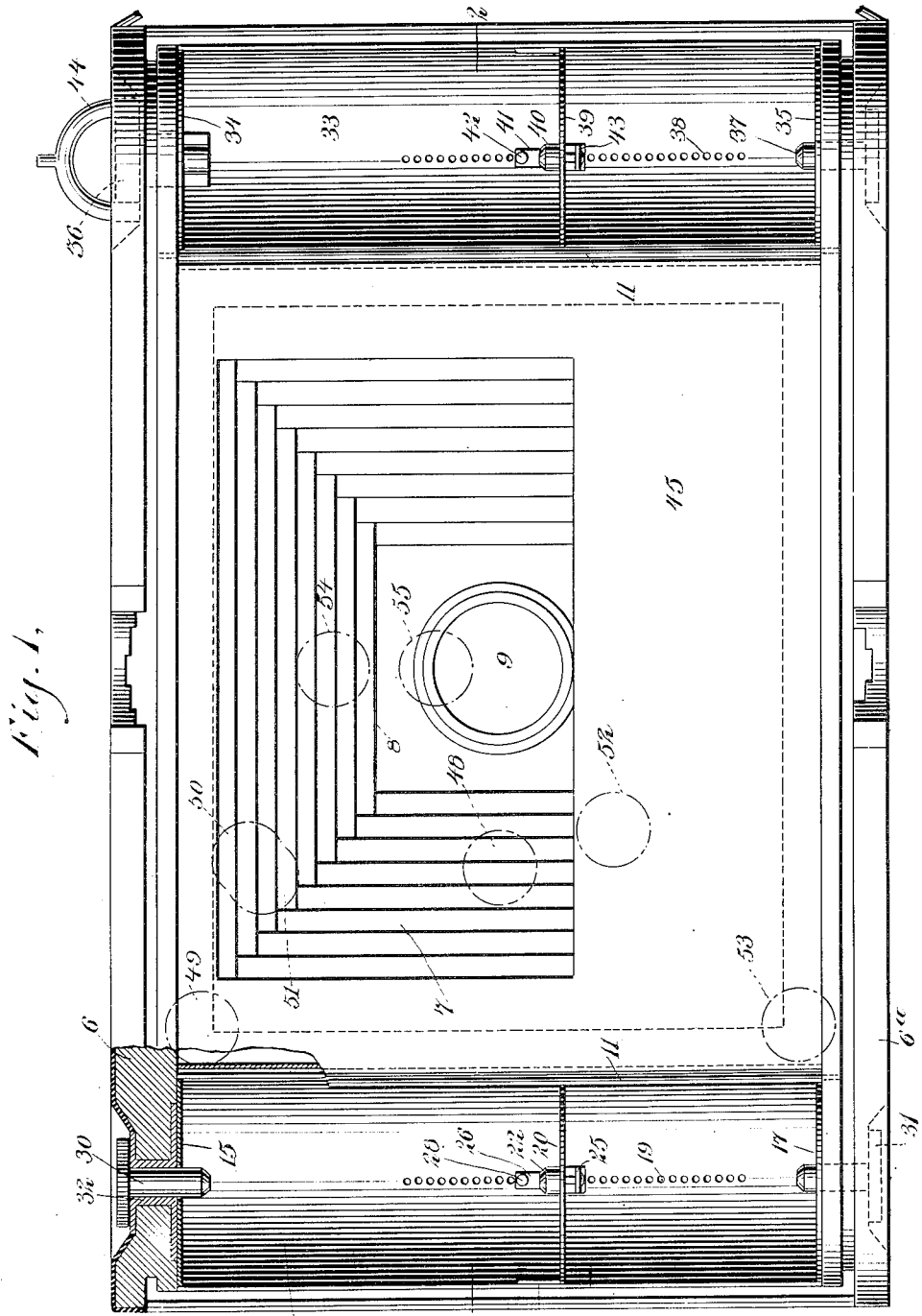
WITNESSES
Edward Thorpe
Walton Harrison
INVENTOR
Charles Ogburn Harper
BY
ATTORNEYS C. O. HARPER.
CAMERA ATTACHMENT.
APPLICATION FILED AUG. 18, 1908. RENEWED APR. 26, 1912.
1,068,895.
Patented July 29, 1913.
3 SHEETS—SHEET 2.
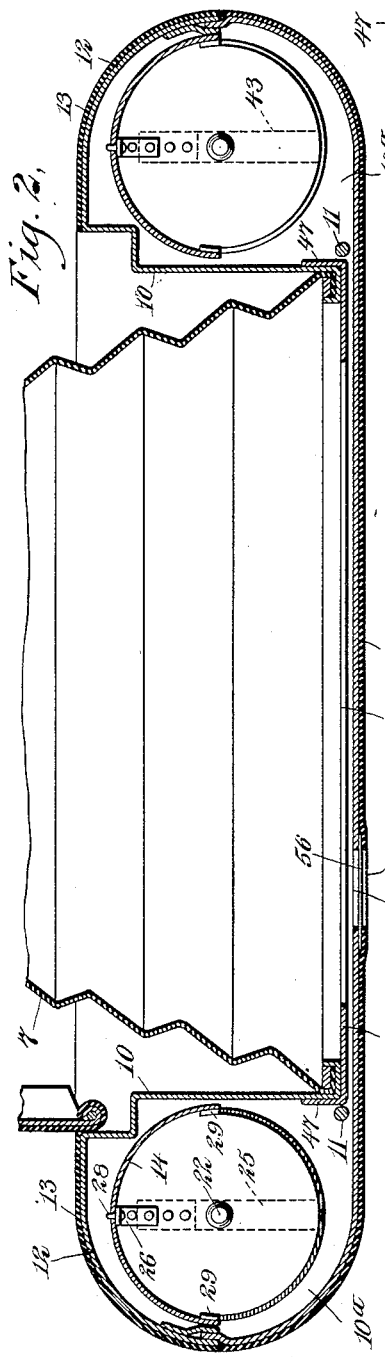
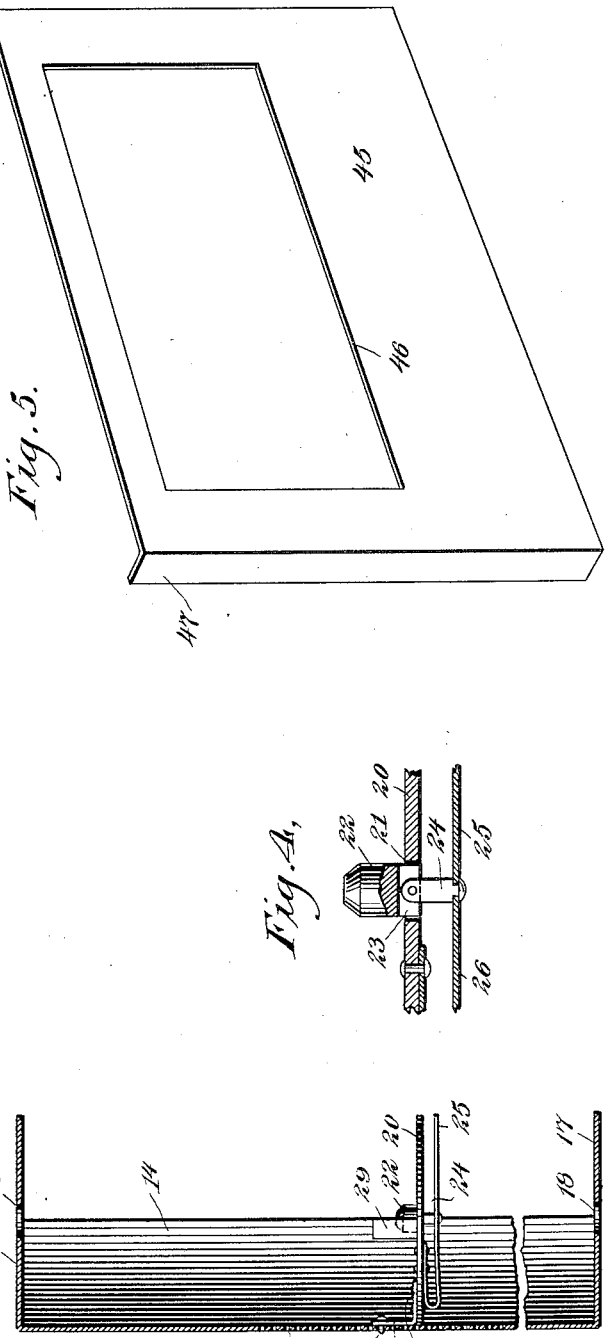
WITNESSES
Edward Thorpe,
Walton Harrison
INVENTOR
Charles Ogburn Harper
BY
Munn & Co.
ATTORNEYS

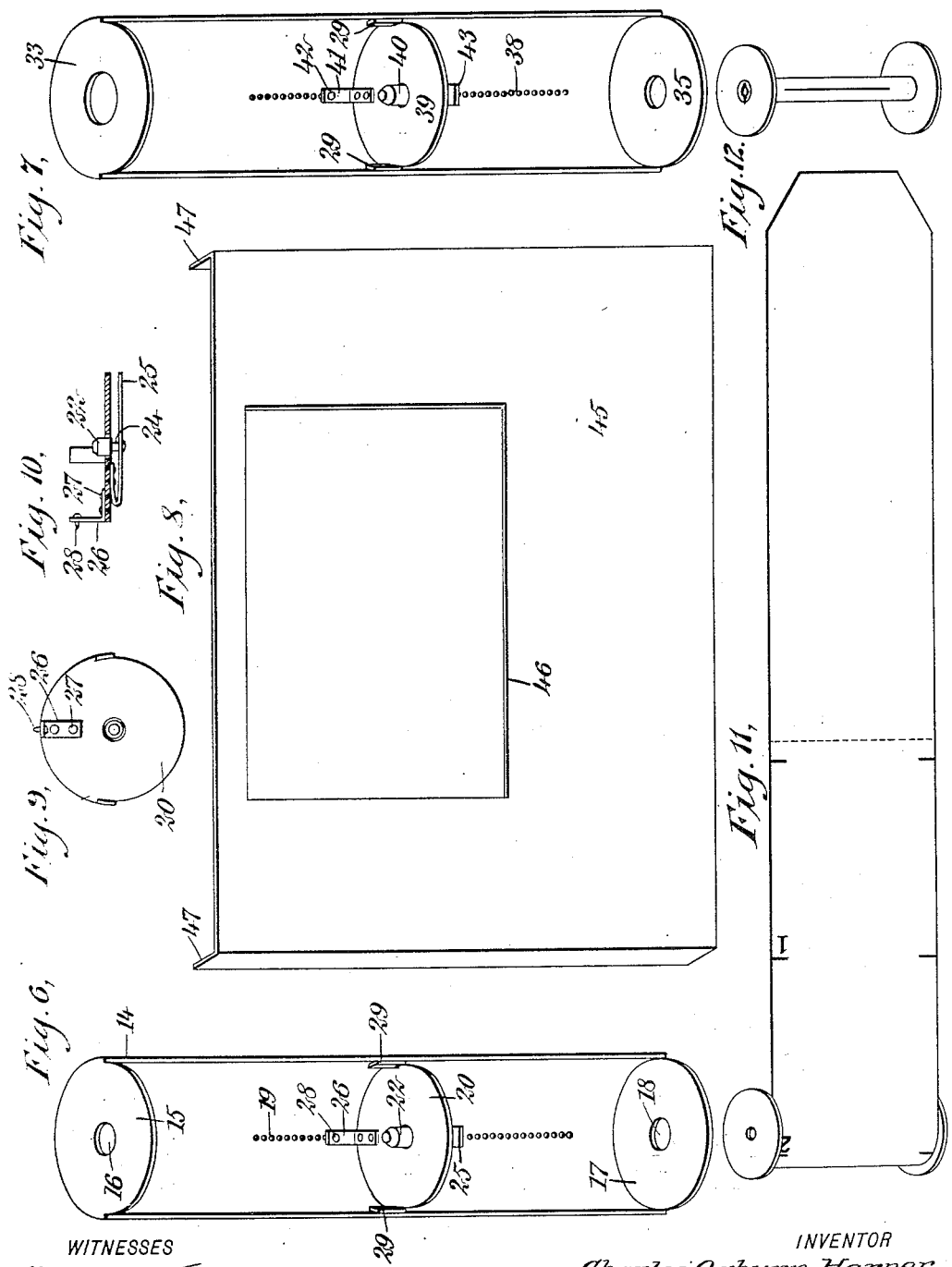

UNITED STATES PATENT OFFICE.

CHARLES OGBURN HARPER, OF LOUISVILLE, KENTUCKY.

CAMERA ATTACHMENT.

1,068,895. Specification of Letters Patent. Patented July 29, 1913.

Application filed August 18, 1908, Serial No. 449,019. Renewed April 26, 1912. Serial No. 693,313.

*To all whom it may concern:*

Be it known that I, CHARLES OGBURN HARPER, a citizen of the United States, and a resident of Louisville, in the county of Jefferson, State of Kentucky, have invented a new and useful improvement to be used in or with cameras and kodaks that use films in the process of photography—to wit, a camera attachment—of which the following is a full, clear, and exact description.

My invention relates to camera attachments, my more particular purpose being to enable a camera to be adjusted for taking pictures of different sizes, the size of the picture being controlled by the amount of film surface exposed, and this being adjustable at will within reasonable limitations.

More particularly stated, my invention comprehends a camera provided with means for holding revoluble film spools, and provided with mechanism whereby the virtual length of such spools may be controlled at will, the exposure spaces of the camera being likewise controllable at will so that the surface of film subjected to exposure may be brought into accord with the size of picture desired.

Reference is to be had to the accompanying drawings forming a part of this specification, in which similar characters of reference indicate corresponding parts in all the figures.

Figure 1 is a rear elevation of a camera made in accordance with my invention, certain parts being broken away; Fig. 2 is a substantially central horizontal section through the construction shown in Fig. 1, and showing particularly the revoluble spool holders for supporting the film; Fig. 3 is a detail showing in section one of the spool holders for the film; Fig. 4 is a detail showing one of the bosses for engaging the end of a film supporting spool; Fig. 5 is a perspective of one of the shields employed, this shield having an opening commensurate with the size of the picture to be produced; Fig. 6 is a perspective showing one of the spool supports; Fig. 7 is a perspective of the other spool support; Fig. 8 is a perspective of one of the screens 45 of which there are a considerable number having openings of different size; Fig. 9 is a plan view of one of the disks; Fig. 10 is a section through the disk shown in Fig. 9, and parts associated with it; Fig. 11 is a perspective showing one of the spools with the film partially wound thereupon; and Fig. 12 is a perspective of the other spool.

At 6, 6ª, are shown parts of the camera frame, extension bellows appear at 7, and the lens holder is shown at 8 and carries a lens 9. The camera frame is provided with oppositely disposed walls 10 and with guide rods 11 disposed adjacent to these walls. Integral with the walls 10 are semi-cylindrical walls 12 provided externally with coverings 13. The walls 10, 12, with their coverings 13, form inclosing spaces 10ª, as will be understood from Fig. 2. Mounted within one of the spaces 10ª is a semi-cylindrical box 14 provided with a circular end 15, the latter having a central opening 6. The box 14 is further provided opposite the end 15 with another circular end 17 having a central opening 18. The box 14 is also provided with a number of holes 19, the latter being arranged in a straight line. A circular disk 20 is fitted into the box 14 and is provided with a central opening 21. A chuck 22 having the form of a boss is loosely fitted into the opening 21, and provided with a slot 23. A link 24 extends into this slot, and is journaled to the chuck. The link 24 is connected with a leaf spring 25, the latter having a substantially U-shape, and being secured on the underside of the disk 20. By pressing upwardly against the leaf spring 24 the chuck 22 may be raised or lowered relatively to the disk 22.

A fastening member 26 having a general L shape is secured by rivets 27 to the top side of the disk 20. A bolt 28 is fitted into the fastening member 26, and is adapted to be inserted through any one of the holes 19 so as to support the fastening member 26, and the disk 20. By taking out the bolt 28 and inserting it in some other hole 19 the disk 20 may be adjusted relatively to the box 14.

The disk 20 is provided with ears 29 integral with it, these ears engaging the inner surface of the box 14 and serving to hold the disk 20. Pegs 30—31 are disposed at opposite ends of the box 14, and are in line with each other. These pegs are supported in sleeves 32.

Upon the opposite side of the camera is a box 33 very much like the box 14. The box 33 is provided at its opposite ends with disks 34, 35, and with pegs 36, 37. The box 33 is further provided with a number of holes 38 arranged in a row. A disk 39 is movable in relation to the box 33. Extending centrally through the disk 39 is a boss 40 constituting a chuck. A fastening member 41 supports the disk 39 and may be adjusted along the box 33 by the aid of a bolt 42, the latter being adapted to extend through any one of the holes 38. A leaf spring 43 is mounted upon a disk 39 and bears the same relation thereto that the leaf spring 25 bears to the disk 20. A key 44 is connected with the peg 36 for the purpose of turning the same and consequently moving the film. In order to prevent exposure of a larger surface of the film than would otherwise be necessary, I employ a screen 45 provided with an opening 46. There are several of these screens and the openings are of different sizes, as will be understood by contrasting Figs. 5 and 8. Each of these screens is provided with flaring edges 47 and is mounted in position, as indicated in Fig. 2. The openings 45 are properly centered and otherwise positioned for regulating the amount of surface exposure of the film.

The camera is provided with a peep-hole 48 and with a hole 49 through the covering 12ª and in registry with the hole 48. This is used for enabling the operator, by looking at the successive numbers upon the backs of the films, to ascertain at any particular moment how many exposures of the film have already been made. Since, however, different screens 45 may have different sized openings 46, it is desirable to have more than one hole 48. I therefore provide a number of holes 49, 50, 51, 52, 53, 54 and 55, and each hole is provided with a pane 56 of glass for the purpose of enabling the operator to see sufficiently to focus and otherwise manipulate the camera. The glass used for these panes is colored for the purpose of excluding the entrance of undesirable light rays into the camera. One of the spools is shown at 55 and at 56 is the film which is partially wound upon it. This film is provided with graphic symbols (see legends 1, 2, etc.,) in the usual manner. Standard lengths of film are used and hence there is a definite vertical and lateral relation of the peep-hole for one size of film to that of the peep-hole for another size of film, so that the peep-holes are located in the first instance in proper position to be easily brought into registry with the various legends represented by films of different lengths. At 57 is the other spool—that is, the spool upon which the film 56 is wound as rapidly as it is unwound from the spool 55. The spools are essentially film supporters.

My device is used as follows: Suppose that the operator wishes to make comparatively small pictures. He selects a narrow film and winds the same upon spools to fit it. These spools are located in the boxes 14, 33 adjacent the disks 20, 39. In doing this he first mounts a spool in the box 14, then grasps the end of the film and draws it across to the box 33, passing the film around the guide rods 11, as will be understood from Fig. 2. The film is at the right of Fig. 1. By turning the key 44 the film is gradually wound in the box 33 and withdrawn from the box 14. Each time a picture is taken the operator advances the film, merely moving it a distance sufficient to supply the requisite quantity of film surface for the purpose. The film while being thus used is effectively housed and hidden from the light. Suppose now that the operator desires to make a larger picture. He selects a larger film and mounts it, as before stated, in the boxes 14, 33, the disks 20, 39 being adjusted accordingly. The operator further selects an appropriate screen 45 having its opening 46 the proper size to suit the new pictures. The operator then proceeds as before, feeding the film step by step as it is used, the steps, of course, being longer owing to the increased film surface required.

From the above description it will be seen that I enable a camera of a given size to make pictures of smaller sizes than would normally be suited to the camera. It will also be noted that while I can take smaller pictures by aid of a large camera, the waste of the film is not greater than would be the case if the same film was used in connection with a smaller camera for making pictures of the same kind.

Having thus described my invention, what I claim as new and desire to secure by Letters Patent is:

The combination with a camera for exposure of successive portions of continuous films and having a plurality of peep holes spaced at different distances from one of its edges in a direction extending lengthwise of the films for the purpose of registering with successive legends carried by said films as said films are moved into successive positions for exposure, film holders mounted within said camera and adjustable for accommodating films of different widths, and a plurality of interchangeable shields severally provided each with an opening of a different length measured in the general direction of the length of the films, the length of the opening in each shield corresponding to the spacing of the legends carried by a particular film.

Witness my signature hereto in the presence of two witnesses.

CHARLES OGBURN HARPER.

Witnesses:
CHARLES WILLIAM STEIN,
FLEMING GARNETT HARPER.